US007181226B2

(12) United States Patent
De Ruijter et al.

(10) Patent No.: US 7,181,226 B2
(45) Date of Patent: Feb. 20, 2007

(54) METHOD FOR DIGITALLY TRANSFERRING INFORMATION VIA TELEPHONE CONNECTIONS

(75) Inventors: Markus De Ruijter, Bruckmuehl (DE); Leo Vollmuth, Mengen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 502 days.

(21) Appl. No.: 10/117,138

(22) Filed: Apr. 8, 2002

(65) Prior Publication Data

US 2002/0147013 A1 Oct. 10, 2002

(30) Foreign Application Priority Data

Apr. 6, 2001 (DE) ................................ 101 17 130

(51) Int. Cl.
*H04Q 7/20* (2006.01)

(52) U.S. Cl. ............................... 455/456.1; 455/456.2; 455/456.3

(58) Field of Classification Search ............. 455/456.1, 455/456.2, 466, 414, 456, 551; 701/213; 340/7.1, 573.4; 342/457; 379/142.01, 357.01
See application file for complete search history.

(56) References Cited

U.S. PATENT DOCUMENTS

| | | | | |
|---|---|---|---|---|
| 5,280,516 | A * | 1/1994 | Jang | 340/7.1 |
| 5,428,666 | A * | 6/1995 | Fyfe et al. | 455/551 |
| 5,544,225 | A * | 8/1996 | Kennedy et al. | 455/412.1 |
| 5,652,570 | A * | 7/1997 | Lepkofker | 340/573.4 |
| 5,838,277 | A | 11/1998 | Loomis et al. | |
| 5,844,522 | A * | 12/1998 | Sheffer et al. | 342/457 |
| 5,918,180 | A * | 6/1999 | Dimino | 455/456.3 |
| 5,987,329 | A * | 11/1999 | Yost et al. | 455/456.1 |
| 6,028,537 | A * | 2/2000 | Suman et al. | 340/988 |
| 6,496,702 | B1 * | 12/2002 | Lockhart | 455/456.5 |
| 6,522,265 | B1 * | 2/2003 | Hillman et al. | 340/988 |
| 6,542,591 | B1 * | 4/2003 | Amro et al. | 379/142.01 |
| 6,609,005 | B1 * | 8/2003 | Chern | 455/457 |
| 6,611,755 | B1 * | 8/2003 | Coffee et al. | 701/213 |
| 6,625,456 | B1 * | 9/2003 | Busso et al. | 455/456.2 |
| 6,716,101 | B1 * | 4/2004 | Meadows et al. | 455/456.1 |
| 2001/0001090 | A1 * | 5/2001 | Harjula | 455/456 |
| 2002/0068549 | A1 * | 6/2002 | Tendler | 455/414 |
| 2002/0068584 | A1 * | 6/2002 | Gage et al. | 455/456 |

FOREIGN PATENT DOCUMENTS

| | | | |
|---|---|---|---|
| DE | 29923635 | | 1/2001 |
| EP | 0963088 | * | 8/1999 |
| EP | 0963088 | | 12/1999 |
| EP | 963088 A1 | * | 12/1999 |
| EP | 1158475 | | 11/2001 |

* cited by examiner

*Primary Examiner*—Duc M. Nguyen
*Assistant Examiner*—Chuck Huynh
(74) *Attorney, Agent, or Firm*—Crowell & Moring LLP

(57) ABSTRACT

In a method for digitally transferring information via telephone connections, in which a receiver registers the sender's telephone number, the receiver is assigned a plurality of callable telephone numbers. Each time a specific sender dials a callable telephone number, the receiver registers this as an individual piece of digital information associated with the called telephone number. A piece of total information is formed from the individual pieces of digital information.

5 Claims, 1 Drawing Sheet

METHOD FOR DIGITALLY TRANSFERRING INFORMATION VIA TELEPHONE CONNECTIONS

BACKGROUND AND SUMMARY OF THE INVENTION

This application claims the priority of German Application No. 101 17 130.7, filed Apr. 6, 2001, the disclosure of which is expressly incorporated by reference herein.

The invention relates to a method for digitally transferring information via telephone connections, in which a receiver registers a sender's telephone number.

A known method of the above-mentioned type is the so-called wireless call positioning service (WCPS). This known WCPS method was presented in the article "Im Netz der Netze [In the Network of Networks]" in the periodical teleTraffic, 9-10/2000, pp. 38 et seq. In this method, a data packet of up to nine characters is attached to an ISDN telephone number as a call-number extension. This data packet is evaluated by a telephone computer, and used further, for example, for a vehicle-positioning system.

The drawback of this known WCPS method is that it is dependent on the maximum transmittable character chain in ISDN telephone numbers.

It is therefore the object of the present invention to improve the above-mentioned method with regard to the independence of the telephone network operator.

This object is accomplished by a method for digitally transferring information via telephone connections, in which the receiver registers the sender's telephone number. The method is characterized in that the receiver is allocated a plurality of callable telephone numbers. The receiver detects each call to a callable telephone number by a certain sender as an individual piece of digital information associated with the called telephone number. A piece of total information is formed from the individual digital information. Further advantageous modifications of the invention are described and claimed herein.

In accordance with the invention, in a method for digitally transferring information via telephone connections, in which the receiver registers the sender's (caller's) telephone number, the receiver is allocated a plurality of telephone numbers to select. The receiver is, for example, a called telephone, a called ISDN system having a plurality of telephone numbers, and/or a called, expanded telephone computer. Each dialing (calling) of a callable telephone number by a specific sender is detected by the receiver, which registers both the sender's telephone number and the dialed telephone numbers, as an individual piece of digital information associated with the dialed telephone number (e.g., dial=1, non-dial=0). The pieces of individual digital information associated with the dialed telephone numbers are combined to form a piece of total information, and may be displayed.

The receiver, in the form of a telephone computer, preferably has a dialing-registration system for registering the sender's telephone number and the telephone numbers dialed by the sender. The receiver additionally has an evaluation unit for processing the individual information and forming and/or displaying the total information.

The method according to the invention is preferably used in geographic vehicle positioning. In this application, a specific vehicle is associated with the sender's telephone number. Furthermore, a surface grid for a possible location is defined by x and y coordinates. The callable telephone numbers are assigned to the x and y coordinates of the surface grid. Finally, at least two individual pieces of digital information for the x and y coordinates are used to form a piece of total information relating to the instantaneous vehicle position, and may be displayed.

The invention expands upon the principle that the receiver can already evaluate a dialing (telephone call) of a certain telephone number as information, even if the call is not accepted. The subject of the present invention does not necessitate the use of the telephone-number extension. The dialing of a particular phone number alone serves as digital 0/1 information (an example of an individual piece of information). If a plurality of callable telephone numbers is available, an arbitrary quantity of information can be transferred. When a specific telephone number is dialed, the caller (sender) is identified by his assigned telephone number (e.g., by the SIM ID in GSM). The sender's telephone number can therefore be allocated to a certain user or a certain transmitting object (such as a vehicle).

Accordingly, in the method of the present invention, the number of callable telephone numbers corresponds to the bit number for a code from which the total information is formed.

An advantage of the method, receiver and application according to the invention is a simple system for digital information transfer, utilizing—at no cost—existing systems (i.e., telephone connections that utilize radio systems (e.g., GSM)).

The drawings illustrate an exemplary embodiment of the invention. They depict the application of the method according to the invention for geographic vehicle positioning.

Other objects, advantages and novel features of the present invention will become apparent from the following detailed description of the invention when considered in conjunction with the accompanying drawings.

DETAILED DESCRIPTION OF THE DRAWINGS

Figure 1:
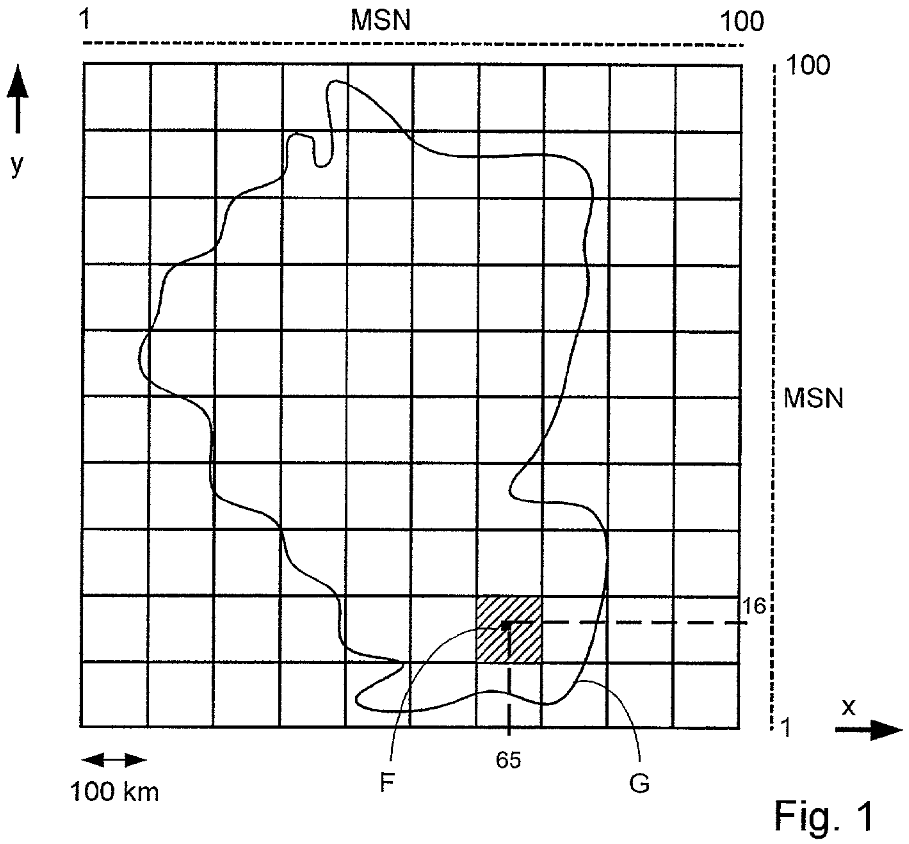
FIG. 1 is a surface grid for coarse positioning by means of callable telephone numbers.

FIG. 1 depicts a possible location G of a vehicle F. The vehicle F is assigned a specific sender telephone number; in other words, a telephone having a specific telephone number is only used in this vehicle F. If the vehicle F belongs to, for example, a mobile service fleet of an on-call service, each vehicle in this mobile service fleet is assigned its own specific sender telephone number.

To permit the transfer of the position of the vehicle F within the possible location G (for example, Germany) to the control center of the on-call service, a square surface grid is superposed over the possible location G. In FIG. 1, a surface grid having a 1000-km lateral length and 100 equidistant divisions per coordinate axis (x, y) is selected.

Figure 2:
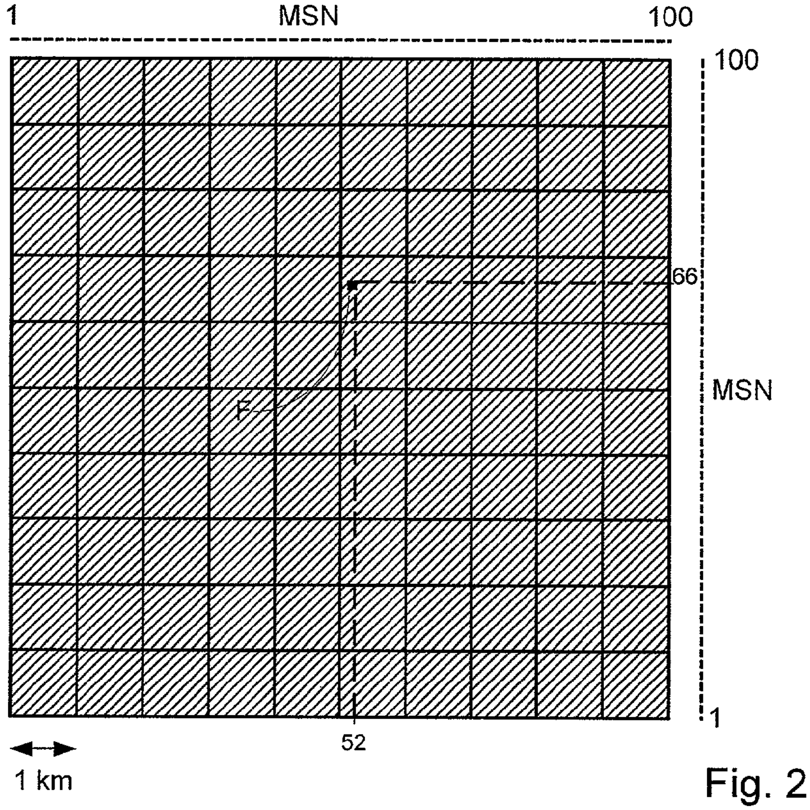
FIG. 2 is a surface grid for fine positioning by means of the same callable telephone numbers.

For fine positioning, the surface grid can be overlaid with two different grid widths: a coarse grid having 100×100 squares on a surface of 1000 km×1000 km (FIG. 1), and a fine grid having 100×100 squares on a surface of 10 km×10 km (FIG. 2).

The control center is equipped with a special ISDN telephone computer (not shown here), which is assigned 100 callable telephone numbers (MSN). (For receiving a plurality of calls in parallel, for example, ten ISDN base connections with 10 MSN each are set up.)

The lateral lengths of the surface grids are each divided into 100 equidistant segments. The 100 equidistant segments define the x coordinates and y coordinates, with each segment of each axis being assigned one of the 100 telephone numbers MSN. Accordingly, the 100 telephone numbers MSN can respectively define an x coordinate and a y coordinate. When a sender that is built into the vehicle F (sender telephone number) establishes a modem connection by dialing the ISDN telephone computer, the telephone computer (receiver) registers and analyzes the dialed telephone number and refuses to accept the call. The modem then terminates the call. No telephonic connection is made. A further advantage of this is that no conversation or transmission fees are incurred.

In the fine positioning procedure, the actual position of the vehicle F can be determined from the 10,000×10,000 possible positions with four calls: To be able to indicate a square within the large surface grid according to FIG. 1, two calls are necessary in the control center if there are 100 callable telephone numbers MSN. For the first call, the telephone number of the x coordinate is dialed ($65^{th}$ MSN in the illustrated example); for the second call, the telephone number of the y coordinate is dialed ($16^{th}$ MSN in the illustrated embodiment). The receiver, in the form of the telephone computer, uses a stored table to ascertain a telephone number-position association. In the telephone computer, the individual digital information 1 (=call) relating to the two dialed telephone numbers is used to form the total information, in the form of the position of the vehicle F in the location G, which may be displayed on a monitor. A position is preferably only conveyed into the control center if the vehicle has actually changed its position within a time interval. The time interval can be set individually.

In the discussed example according to FIG. 1, the vehicle F is located in the square defined by the $65^{th}$ MSN for the x coordinate and the $16^{th}$ MSN for the y coordinate. This corresponds to a coarse positioning with a 10-km accuracy. In fine positioning, two additional calls are necessary to increase the resolution to 100-m accuracy. The hatched surface element shown in FIG. 1 is, as shown in FIG. 2, subdivided into a grid having 100×100 possible positions or squares. Again, from the telephone number of the sender in the form of the vehicle F, the x coordinate is ascertained with the callable $52^{nd}$ MSN and the y coordinate is ascertained with the callable $66^{th}$ MSN. A further table in the telephone computer (receiver) is used to effect the fine positioning through a telephone number-position association.

The position calculated by the telephone computer using the four calls is conveyed, for example, into the geographical information system of the control center, and displayed there.

The time intervals for the calls are preferably selected such that the vehicle F would be unable to drive out of the 10×10 km grid square at its highest speed. The origin of the x-y coordinate system is preferably established in the center of the surface grid to allow for deviations in all directions.

If the control center knows the position of the vehicle F, only the difference position may need be conveyed with regular calling by the sender (telephone of vehicle F). Frequently, only two more calls are necessary for this.

EXAMPLE (NOT ILLUSTRATED HERE)

A vehicle travels (in the fine grid according to FIG. 2) 0.2 km east from a "position" ($50^{th}$ MSN, $50^{th}$ MSN) and 0.4 km south. At this point, it assumes a new "position" ($52^{nd}$ MSN, $46^{th}$ MSN). Accordingly, only two further calls are necessary, namely to the $52^{nd}$ MSN and the $46^{th}$ MSN. The position is always accurate up to 100 m.

If the maximum speed of the vehicle F is assumed to be 200 km/h, the calls must be made at intervals no longer than 90 s.

If the vehicle F has traveled an additional 5 km since the last call (for example, a call comes too late because of a GSM receiving gap or tunnel passage), the position must be updated with four calls. The vehicle F is aware of when the last call was made, and how far it has traveled since then. The self-positioning of the vehicle is effected, for example, with a navigation system equipped with a GPS sensor. The vehicle must also store an allocation table that assigns the respective ascertained position to the corresponding callable telephone numbers. To increase reliability, the absolute position can be transferred with four calls at fixed intervals (e.g., every 15 minutes). GSM or GPS provides a highly-precise time base that can be used to allow the vehicles of a vehicle fleet to make staggered calls. This avoids a scenario in which too many vehicles of a fleet call the same number simultaneously.

Thus, the invention provides a very simple method for economically and precisely locating vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for digitally transferring information from a sender to a receiver via telephone connections, in which the receiver registers a sender's telephone number, the method comprising the acts of:

allocating to the receiver a plurality of callable telephone numbers;

associating an x coordinate with a first set of plurality of callable telephone numbers and a y coordinate with a second set of the plurality of callable telephone numbers;

detecting by the receiver each call to one of the plurality of callable telephone numbers by a certain sender as an individual piece of digital information associated with the one callable telephone number even if the call is not accepted; and forming a piece of total information from the individual piece of digital information obtained by detecting a call to one of the telephone numbers of the first set and one of the telephone numbers of the second set, wherein the total piece of information identifies a geographic location of the sender.

2. A receiver for executing the method according to claim 1, wherein the receiver is a computer connected to a telephone connection, said receiver comprising a dialing registration system for registering the sender's telephone number and the callable telephone numbers called by the sender, said receiver further comprising an evaluation unit for processing the individual pieces of digital information and displaying the total information.

3. A method for digitally transferring information from a sender to a receiver via telephone connections, in which the receiver registers a sender's telephone number, the method comprising the acts of:

allocating to the receiver a plurality of callable telephone numbers;

detecting by the receiver a call to one of the plurality of callable telephone numbers by a certain sender as an individual piece of digital information associated with the one callable telephone number even if the call is not accepted;

forming a piece of total information from the individual pieces of digital information obtained by detecting more than one call;

associating the sender's telephone number with a specific vehicle;

defining a surface grid for a possible location of the specific vehicle with x and y coordinates;

assigning the callable telephone numbers to the x and y coordinates of the surface grid; and using at least two individual pieces of digital information, one representing the x coordinate and one representing the y coordinate, respectively, to form the piece of total information regarding an instantaneous position of the specific vehicle.

4. A method for digitally transferring information from a sender to a receiver via telephone connections, in which the receiver registers a sender's telephone number, the method comprising the acts of:

allocating to the receiver a plurality of callable telephone numbers;

detecting by the receiver a call to one of the plurality of callable telephone numbers by a certain sender as an individual piece of digital information associated with the one callable telephone number even if the call is not accepted; and forming a piece of total information from the individual pieces of digital information obtained by detecting a first call to the first one of the plurality of callable telephone numbers that is associated with an x coordinate and a second call to a second one of the plurality of callable telephone numbers that is associated with a y coordinate, wherein the total piece of information identifies a geographic location of the sender.

5. A receiver for executing the method according to claim 4, wherein the receiver is a computer connected to a telephone connection, said receiver comprising a dialing registration system for registering the sender's telephone number and the callable telephone numbers called by the sender, said receiver further comprising an evaluation unit for processing the individual pieces of digital information and displaying the total information.

* * * * *